(12) United States Patent
Oliver et al.

(10) Patent No.: US 9,708,061 B2
(45) Date of Patent: Jul. 18, 2017

(54) AIRCREW ENSEMBLES

(75) Inventors: Paul Oliver, Rhyl (GB); Peter Gordon, Thornton (GB)

(73) Assignee: SURVITEC GROUP LIMITED, Birkenhead, Merseyside (GB)

( * ) Notice: Subject to any disclaimer, the term of this patent is extended or adjusted under 35 U.S.C. 154(b) by 0 days.

(21) Appl. No.: 13/824,294

(22) PCT Filed: Sep. 29, 2011

(86) PCT No.: PCT/EP2011/067002
§ 371 (c)(1),
(2), (4) Date: Mar. 15, 2013

(87) PCT Pub. No.: WO2012/041971
PCT Pub. Date: Apr. 5, 2012

(65) Prior Publication Data
US 2013/0174311 A1 Jul. 11, 2013

(30) Foreign Application Priority Data
Sep. 30, 2010 (GB) .................................. 1016374.9

(51) Int. Cl.
*B64D 10/00* (2006.01)

(52) U.S. Cl.
CPC ........ *B64D 10/00* (2013.01); *B64D 2010/002* (2013.01)

(58) Field of Classification Search
CPC ................ A41D 13/015; A41D 13/018; A41D 13/0025; A41D 13/002; A62B 17/005; A62B 17/00; B64D 10/00; B64D 2010/002; B64D 2010/005; B64G 6/00
USPC ..................................................... 2/2.14, 456
See application file for complete search history.

(56) References Cited

U.S. PATENT DOCUMENTS

| | | | |
|---|---|---|---|
| 4,242,769 A * | 1/1981 | Rayfield et al. ................. | 441/91 |
| 4,583,522 A * | 4/1986 | Aronne ........................... | 600/20 |
| 5,003,630 A | 4/1991 | Bassick et al. | |
| 5,072,727 A * | 12/1991 | Aronne ...................... | 128/202.11 |
| 5,127,896 A * | 7/1992 | de Gaston ....................... | 600/20 |
| 5,136,722 A | 8/1992 | Moritzen | |
| 6,290,642 B1 * | 9/2001 | Reinhard et al. ............... | 600/20 |
| 6,325,754 B1 | 12/2001 | Reinhardt et al. | |
| 6,450,944 B1 * | 9/2002 | Reinhard ........................ | 600/20 |
| 6,695,762 B1 | 2/2004 | Mah et al. | |
| 2004/0040064 A1* | 3/2004 | Mah et al. ........................ | 2/2.14 |
| 2007/0136922 A1* | 6/2007 | Oliver et al. ....................... | 2/69 |

(Continued)

FOREIGN PATENT DOCUMENTS

| | | |
|---|---|---|
| GB | 2409150 | 6/2005 |
| WO | 99/54201 | 10/1999 |
| WO | 2007/111981 | 10/2007 |

OTHER PUBLICATIONS

European Search Report dated Jan. 21, 2011 as received in European Patent Application No. GB1016374.9.

*Primary Examiner* — Gloria Hale
(74) *Attorney, Agent, or Firm* — Maschoff Brennan

(57) ABSTRACT

An aircrew ensemble comprising a garment (20, 21) for covering at least a part of a body of a wearer and an inflatable counter-pressure bladder (33, 41), carried by the garment (20, 21). The inflatable counter-pressure bladder (33, 41) is formed from a moisture permeable material allowing the passage therethrough of perspiration from the wearer's body.

16 Claims, 23 Drawing Sheets

(56) References Cited

U.S. PATENT DOCUMENTS

Figure 1:
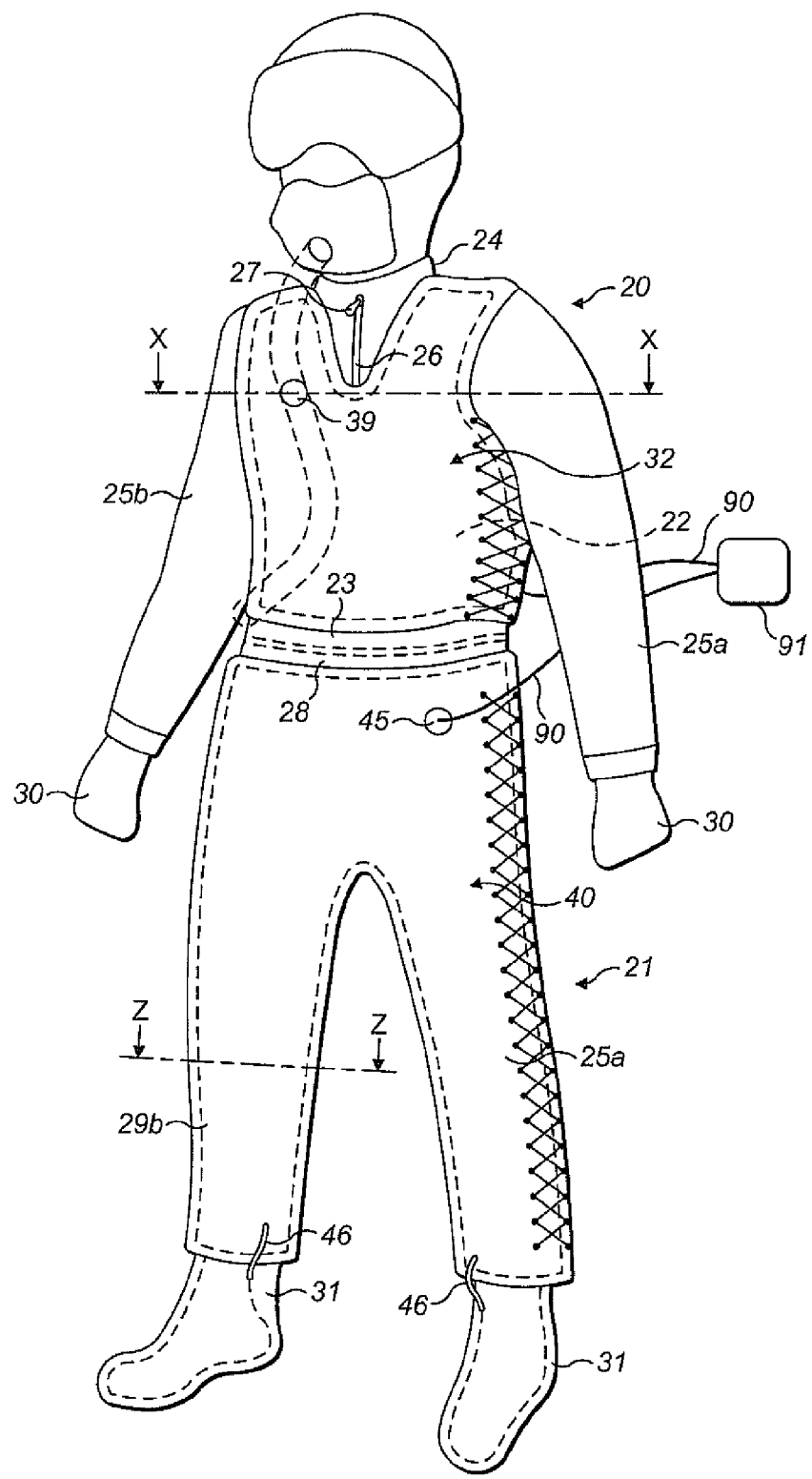

2007/0293715 A1* 12/2007 Reinhard ..................... 600/19
2008/0275291 A1    11/2008 Reinhard
2013/0310633 A1* 11/2013 Reinhard ..................... 600/20

* cited by examiner

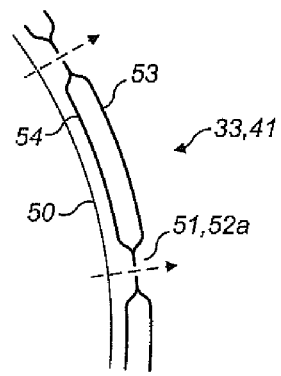 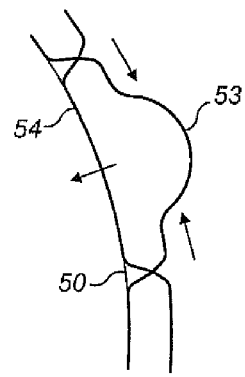
FIG. 14A  FIG. 14B
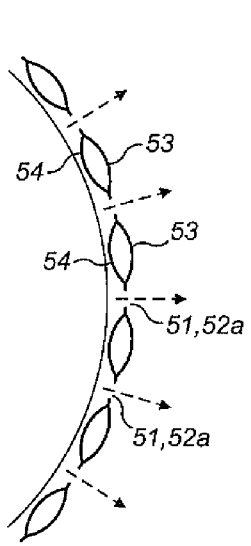 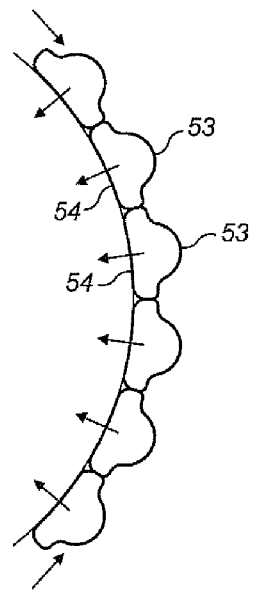 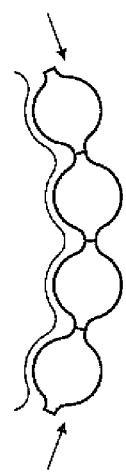
FIG. 14C  FIG. 14D  FIG. 14E

AIRCREW ENSEMBLES

The invention relates to aircrew ensembles worn by aircrew in flight.

Aircrew such as pilots wear an ensemble including a protective suit when flying in aircraft. Traditionally the suit is either a single piece suit combining both jacket and trousers in a single garment or it is a two piece suit with a separate jacket and trousers.

The ensemble may include also special equipment (aircrew life support equipment -ALSE) that protects the wearer against the effects of g-acceleration or altitude and other potentially damaging factors. In this case, the ensemble provides an outer layer that holds and positions and restrains inflatable counter pressure bladders. These bladders can provide counter pressure to the legs when the wearer is being accelerated to reduce the effect of blood pooling in the lower limbs and/or can provide counter pressure to the chest to counteract the effect of breathing pressurized gas when at altitude. Examples of this are shown in WO-A-2007/111981 and in U.S Pat. No. 6,325,754.

An inflatable chest counter pressure bladder is either incorporated into a vest or a jacket type garment which is worn by the pilot over the flight suit, or the bladder is incorporated into the jacket part of the flight suit. Inflatable bladders are either incorporated into a lower body G force garment, which is typically worn over the flight suit, or the bladders are incorporated into the trouser section of the flight suit.

In some cases the bladders are made of a textile (nylon or polyester) which is coated with an air-holding layer of an air impermeable material such as synthetic rubber (e.g. neoprene) or thermo-plastic materials such as polyurethane (PU). Most bladders are now made of a PU coated fabric type because PU is a thermo-plastic material which can be easily welded using high frequency or radio frequency or ultrasonic welding. (Materials such as neoprene need to be glued using a solvent based adhesive which is labour intensive and has health and safety problems).

There are broadly two types of lower body G force bladder assemblies. First, there is a full cover bladder assembly where the inflatable area of the bladder coverage is almost all of the lower limbs and abdomen. Such an inflatable bladder assembly can also be connected at ankle level to an inflatable lining of a flight boot or an inflatable sock lining the boot, or the boot can incorporate an inflatable lining. The counter pressure can be applied directly to the limbs by providing the assembly with a restraining cover with the bladder inflating underneath the restraining cover and the restraining cover allowing the expansion of the bladder only in a direction towards the limbs. Secondly, there is a partial cover bladder assembly (also called a "skeletal" or "five bladder" assembly). In this case two or more bladders (up to 5) cover respective parts of the lower body and are positioned for example, over the leg bone (hence skeletal) and also have a bladder area over the abdomen. In this case, each bladder applies tension to a restraining cover of the assembly as it inflates, which in turn then applies the counter pressure to the limbs through the tensioned cover material.

Such bladder assemblies can be integrated into the trousers of a suit rather than being incorporated into a separate garment, as shown in WO-A-2007/111981.

All counter pressure assemblies whether jackets or vests or lower body G force bladder assemblies of the above types have a problem of placing an excessive thermal burden on the wearer. The full cover lower body G force assembly is the worst in terms of the thermal burden and also has a problem of being excessively bulky. Excessive thermal burden and the consequent hyperthermia on the aircrew increases their fatigue as well as sweat loss and dehydration and reduces aircrew concentration and mission endurance. Increased core temperature also reduces tolerance to the effects of G force acceleration.

According to the invention, there is provided an aircrew ensemble comprising a garment for covering at least a part of a body of a wearer and an inflatable counter-pressure bladder, carried by the garment, the inflatable counter-pressure bladder being formed from a moisture permeable material allowing the passage therethrough of perspiration from the wearer's body.

Figure 2:
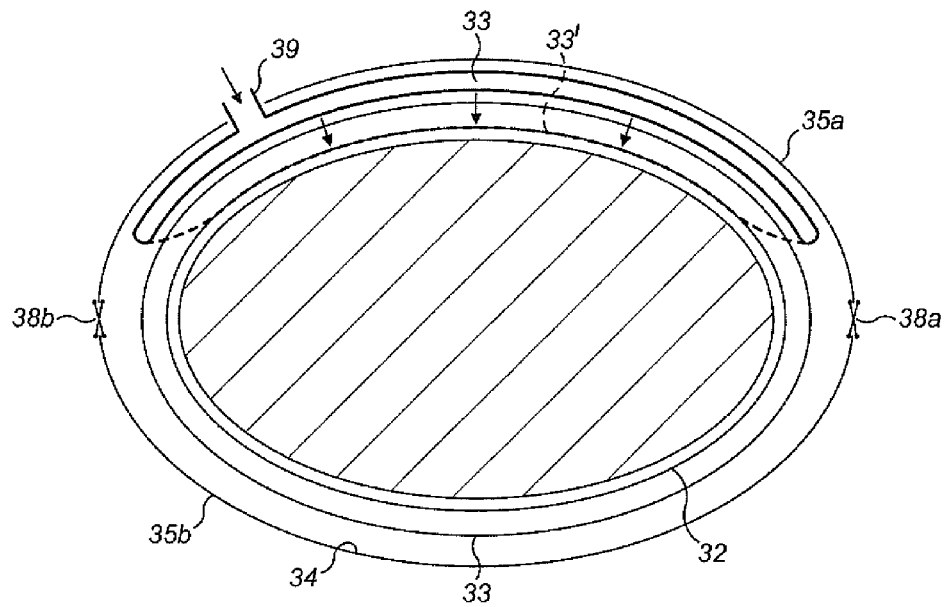
Figure 3:
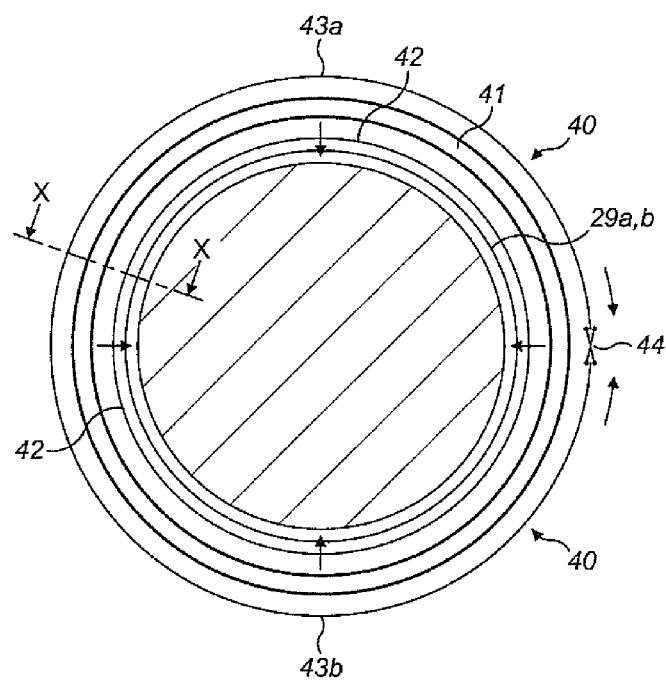
Figure 4A:
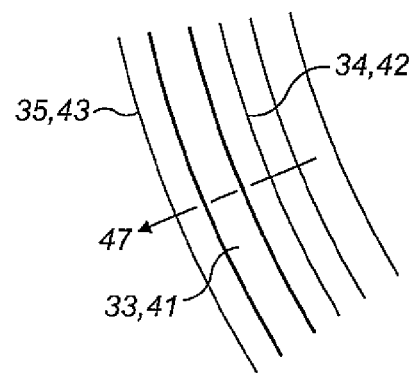
Figure 4B:
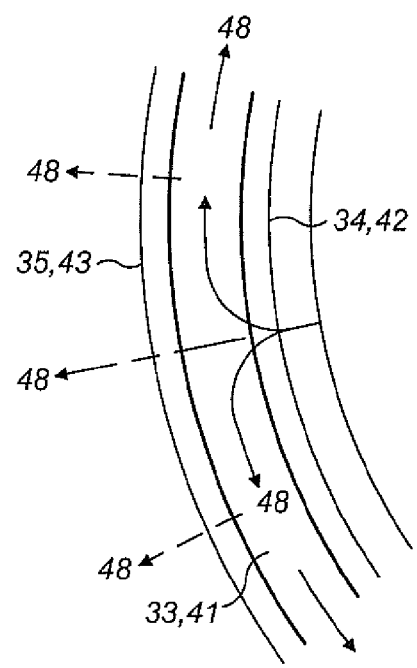
Figure 5:
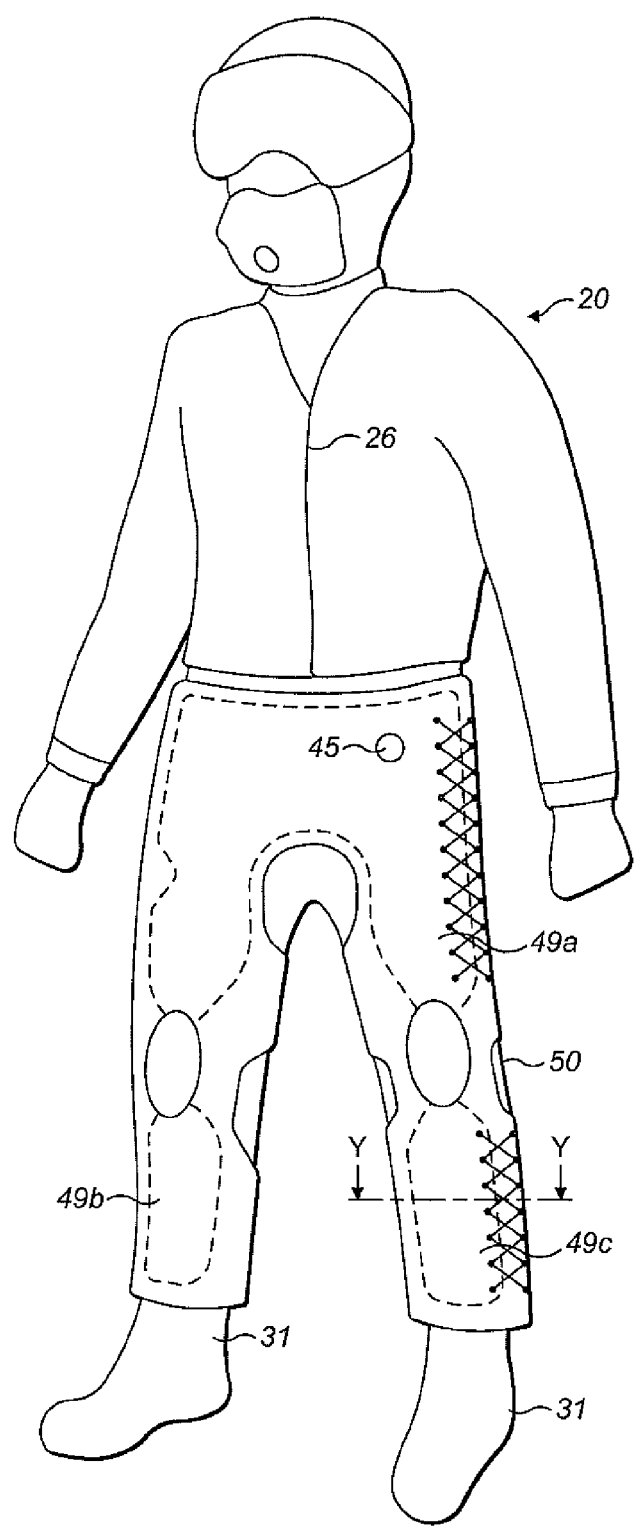
Figure 6:
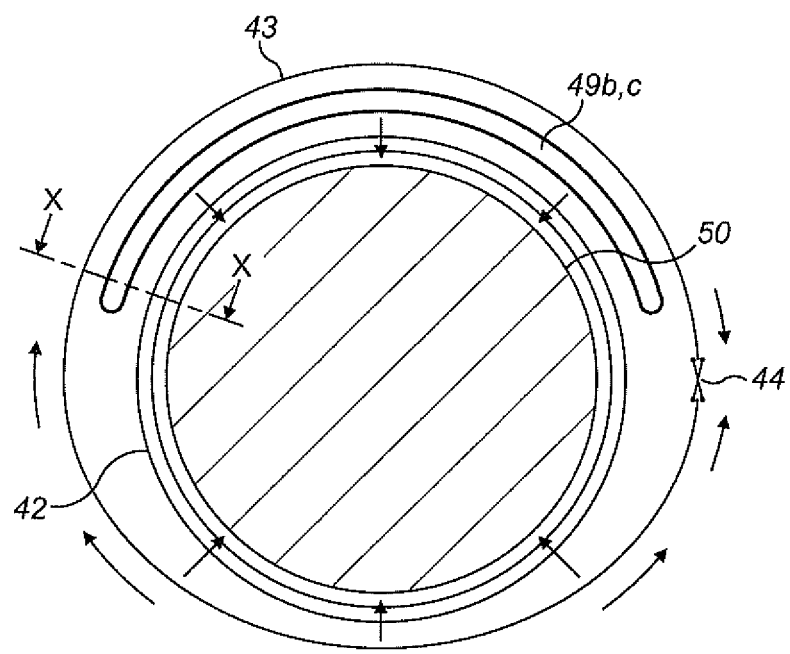
Figure 7A:
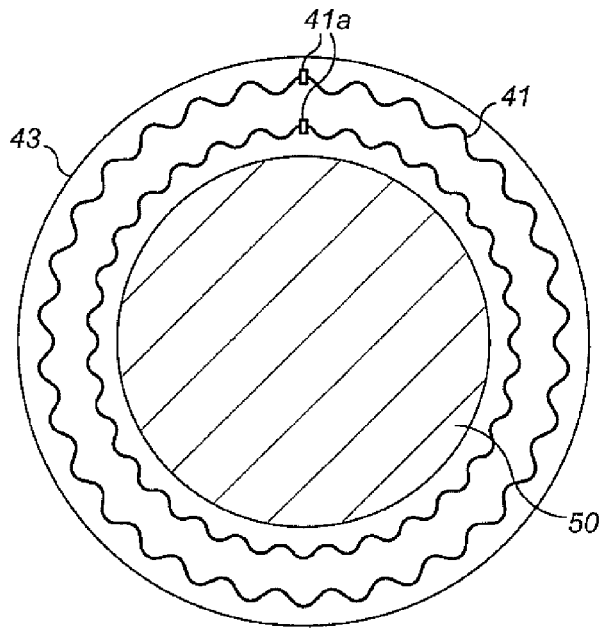
Figure 7B:
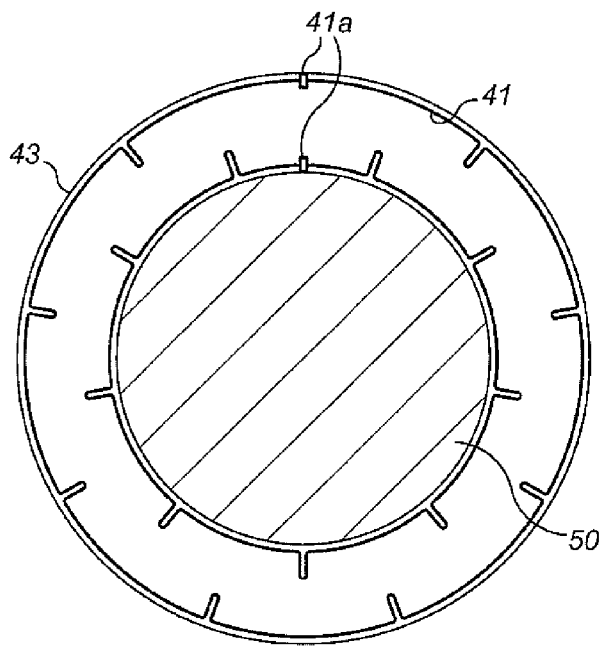
Figure 8A:
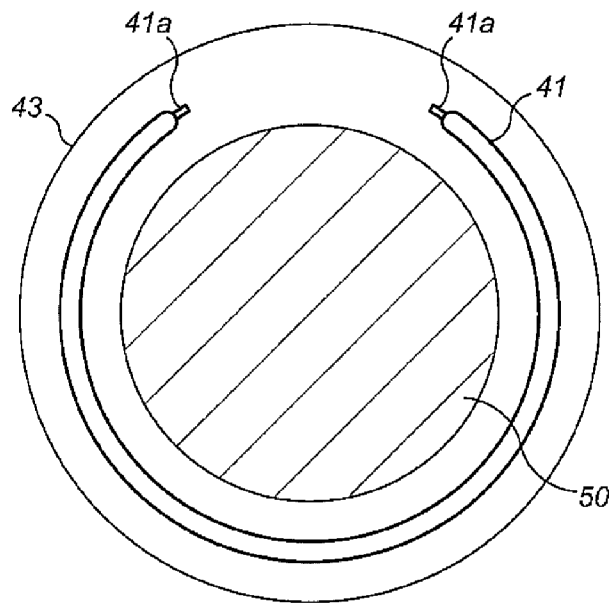
Figure 8B:
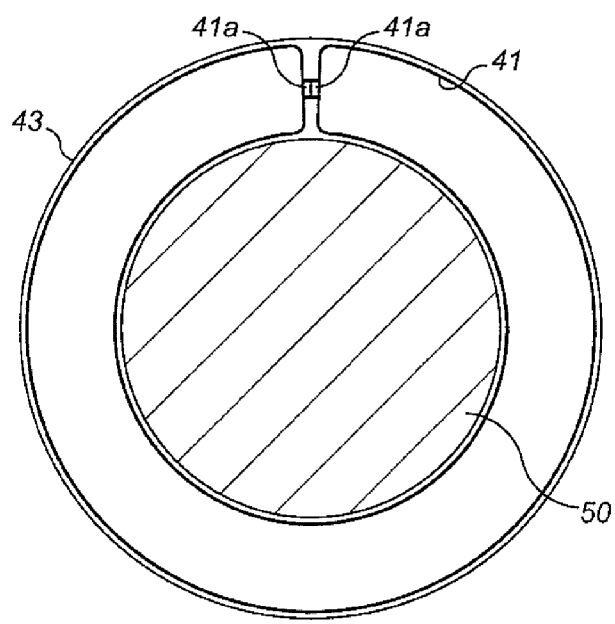
Figure 9:
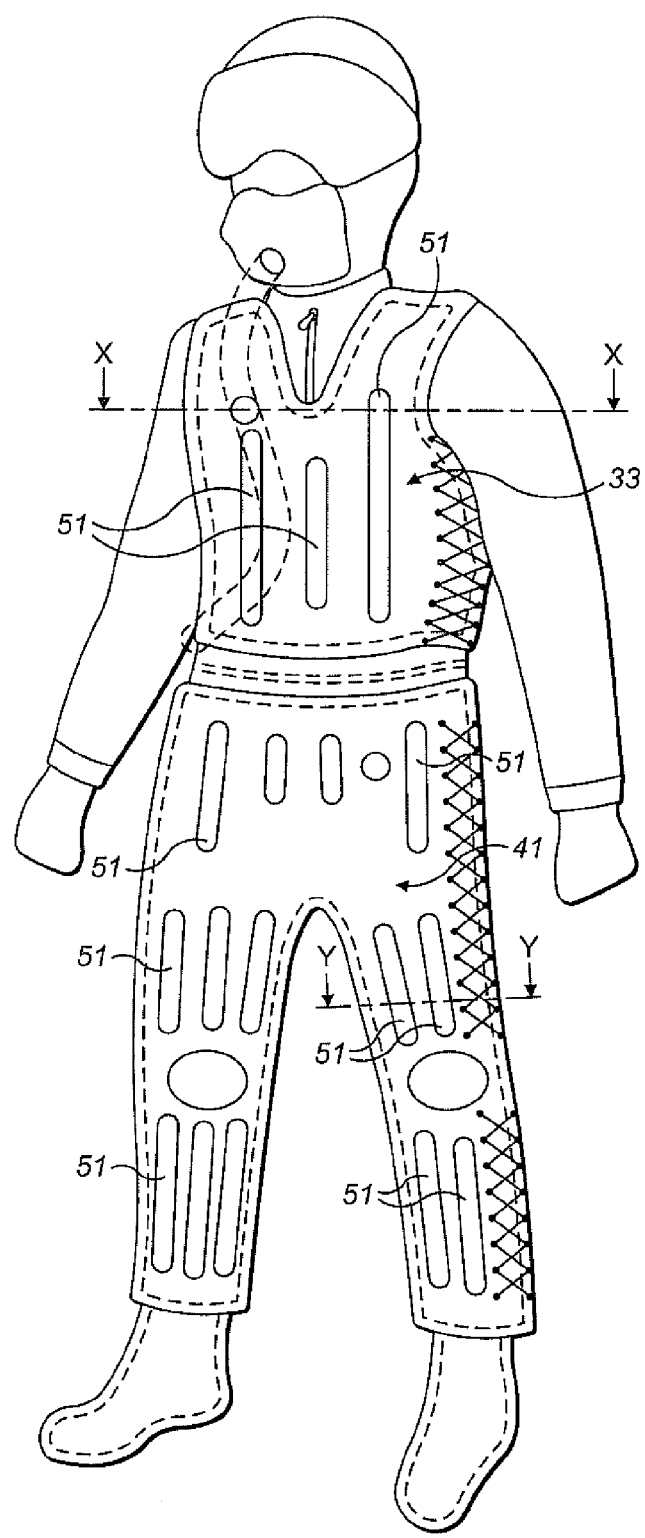
Figure 10:
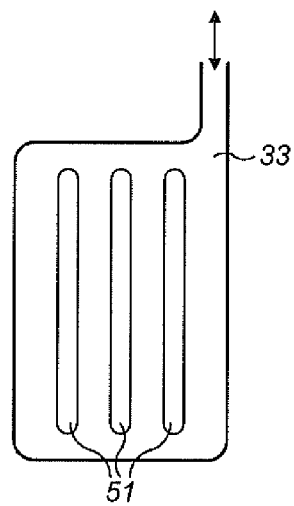
Figure 11:
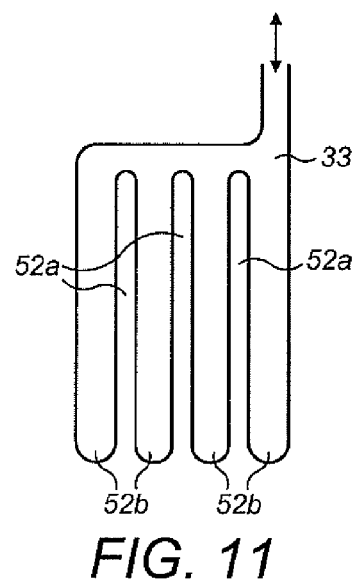
Figure 12:
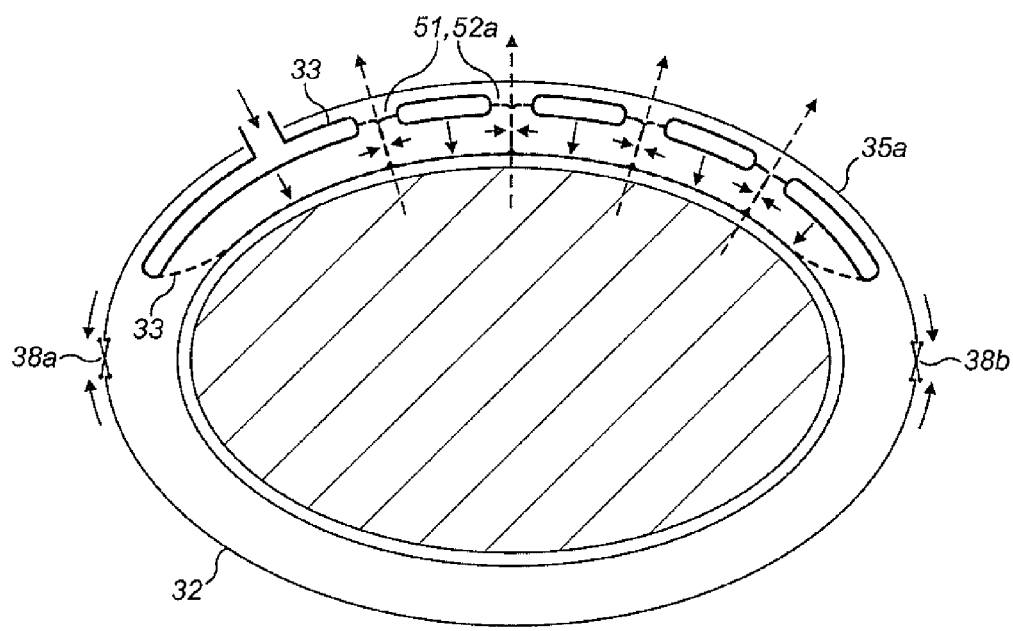
Figure 13A:
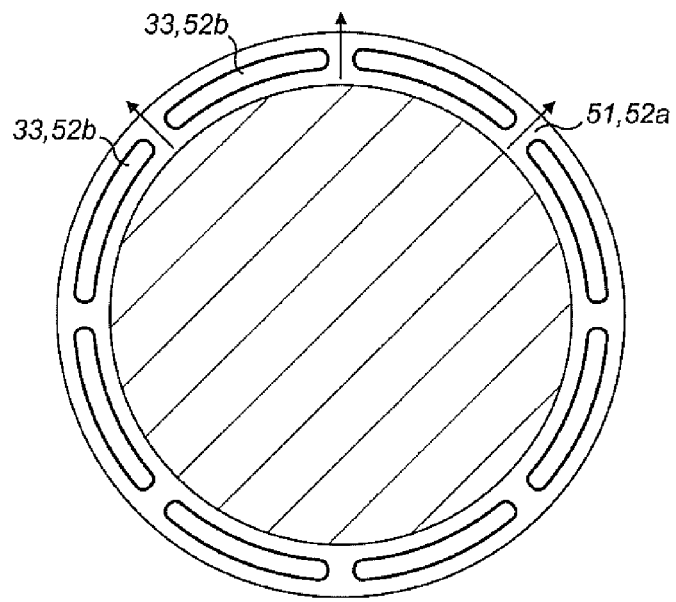
Figure 13B:
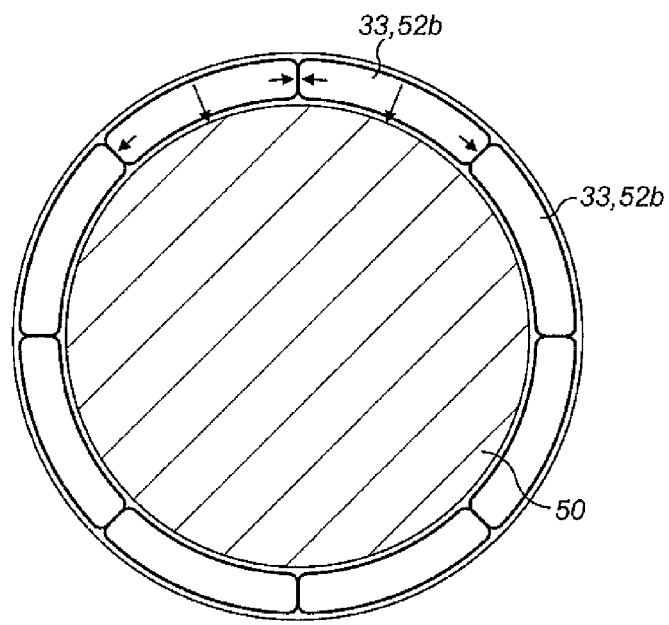
Figure 15:
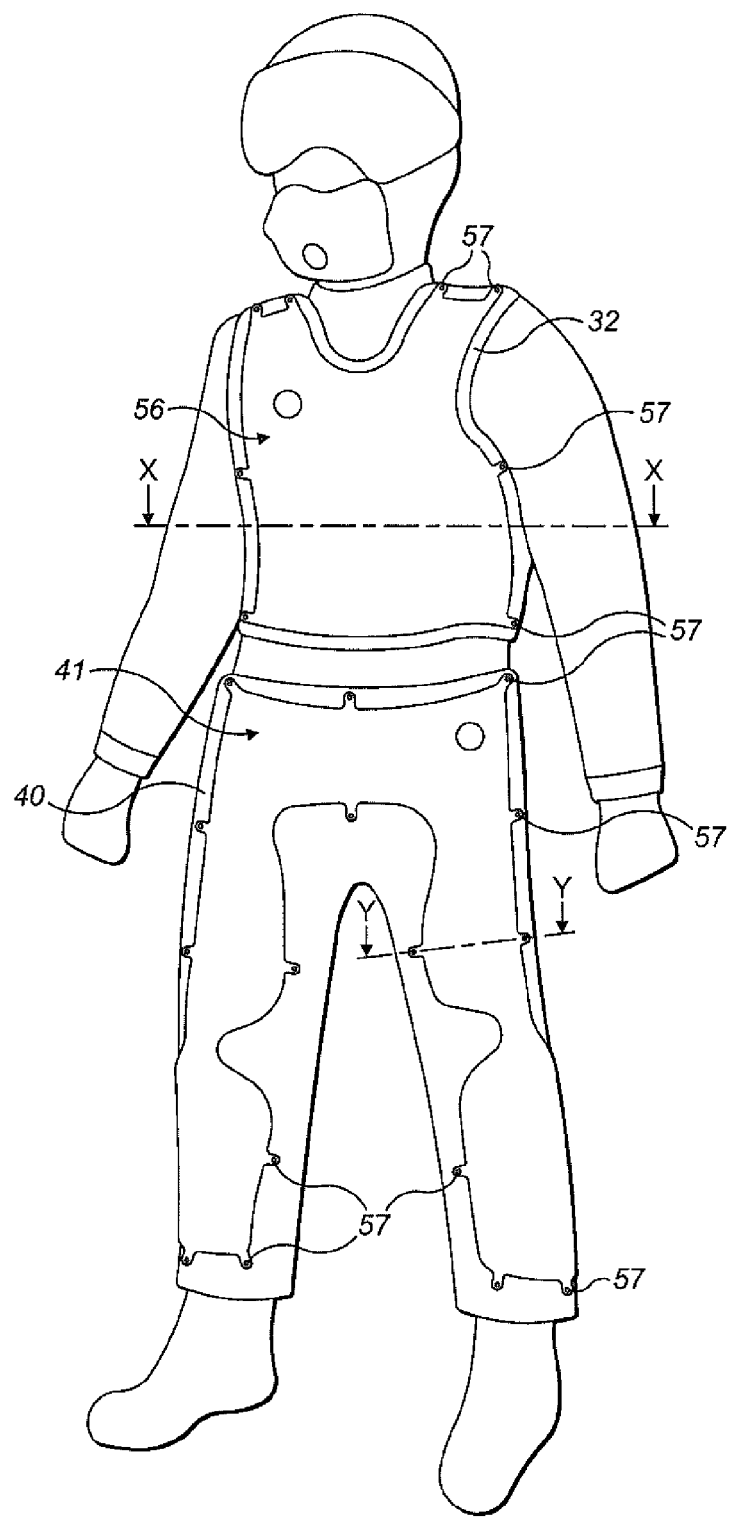
Figure 16A:
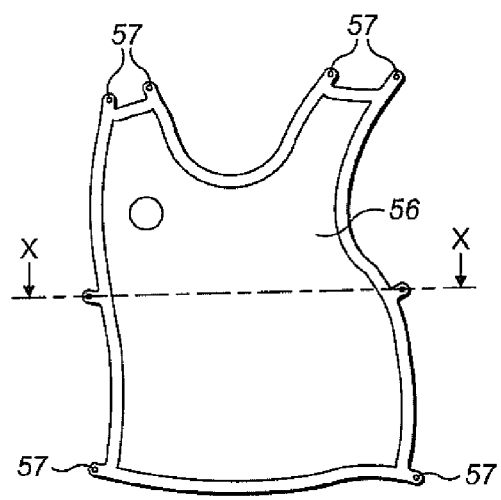
Figure 16B:
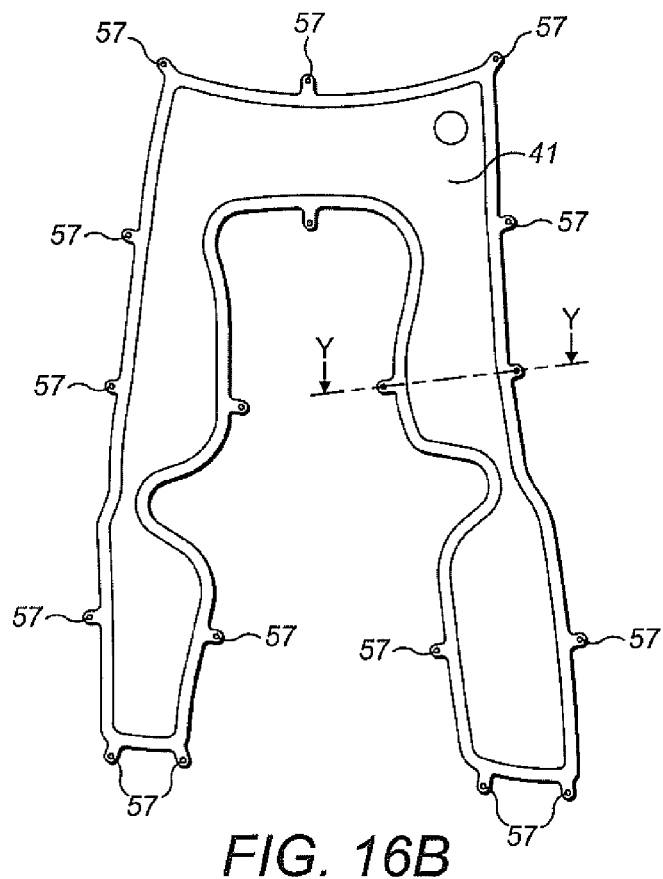
Figure 16C:
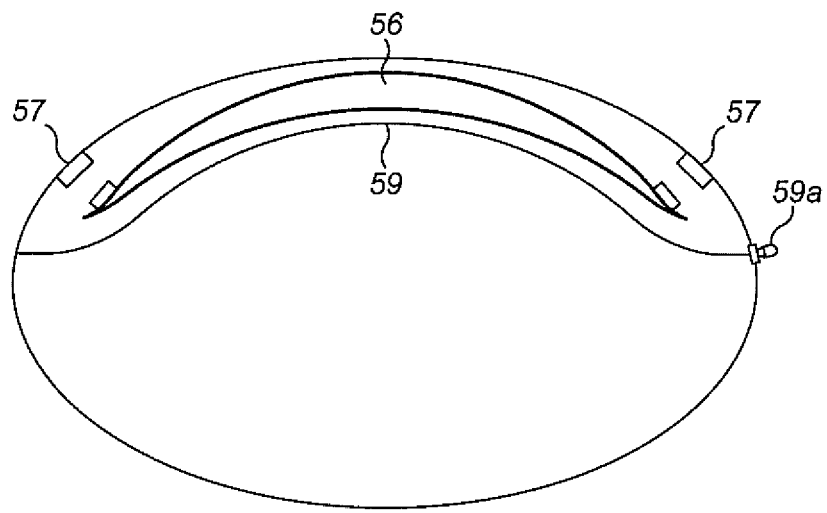
Figure 16D:
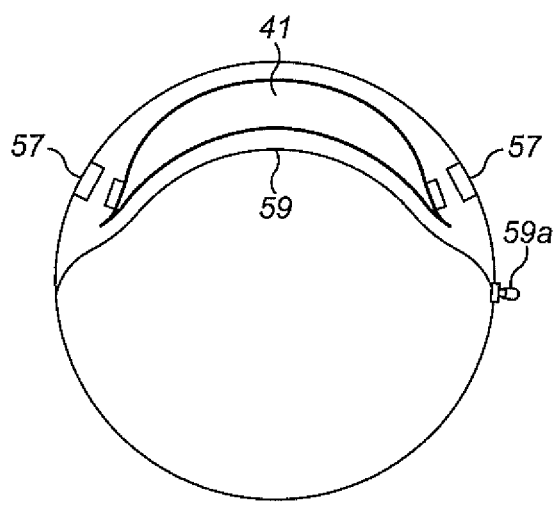
Figure 17:
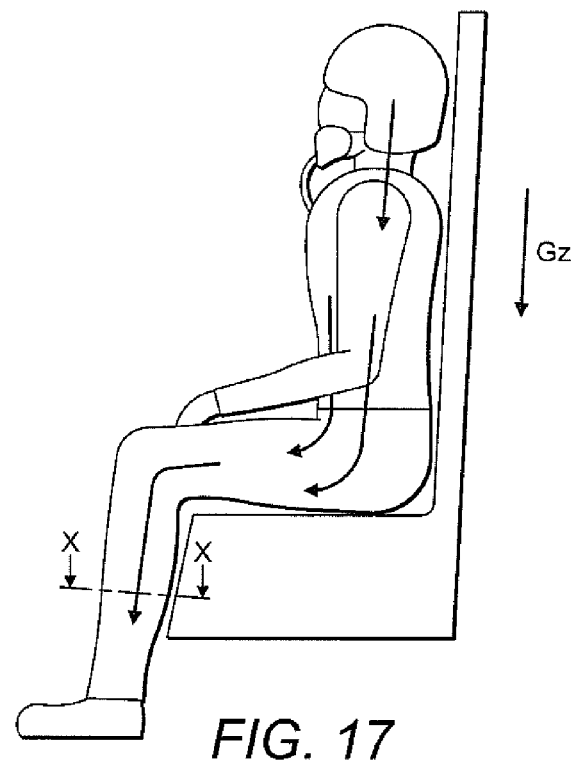
Figure 18:
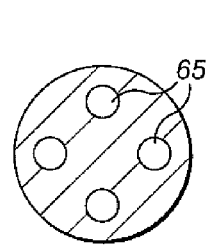
Figure 19:
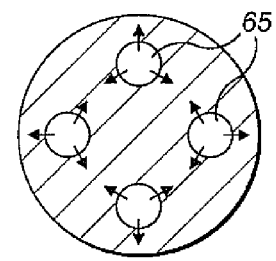
Figure 20:
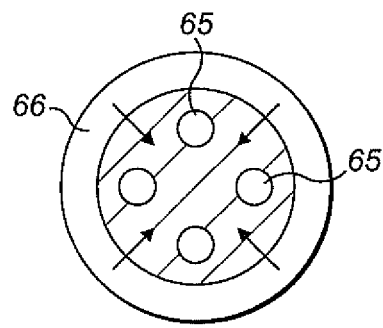
Figure 21:
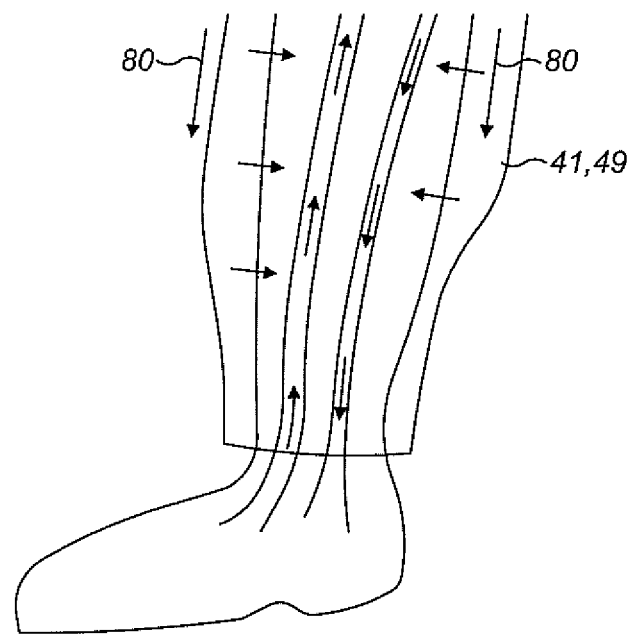
Figure 22:
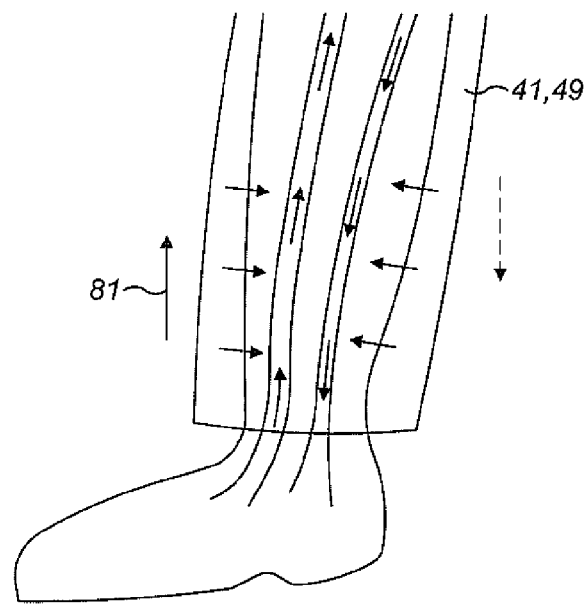
Figure 23:
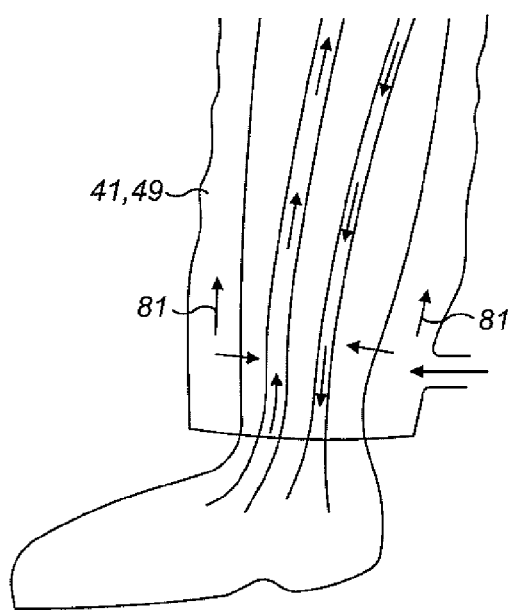
Figure 24:
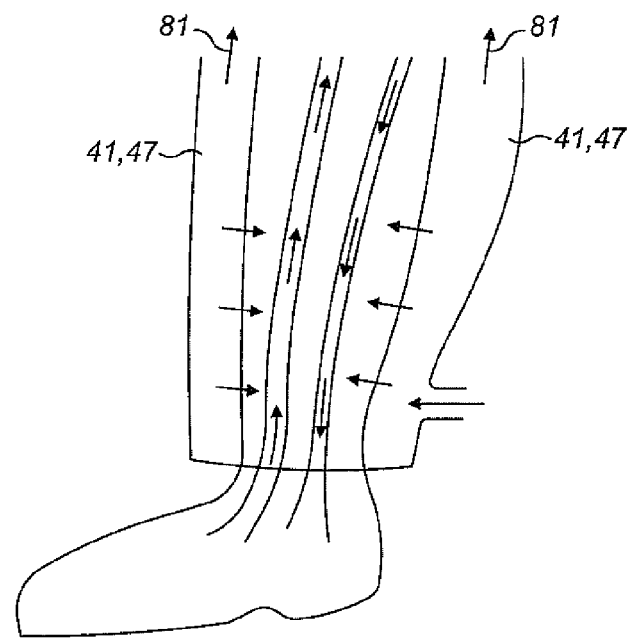
Figure 25:
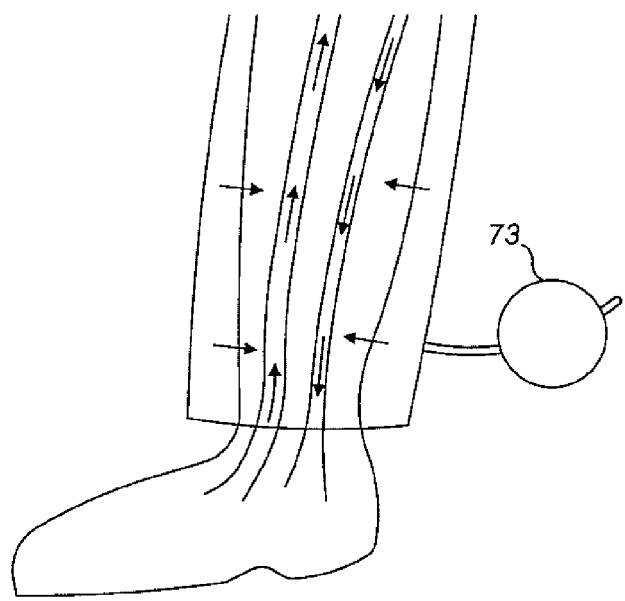
Figure 26:
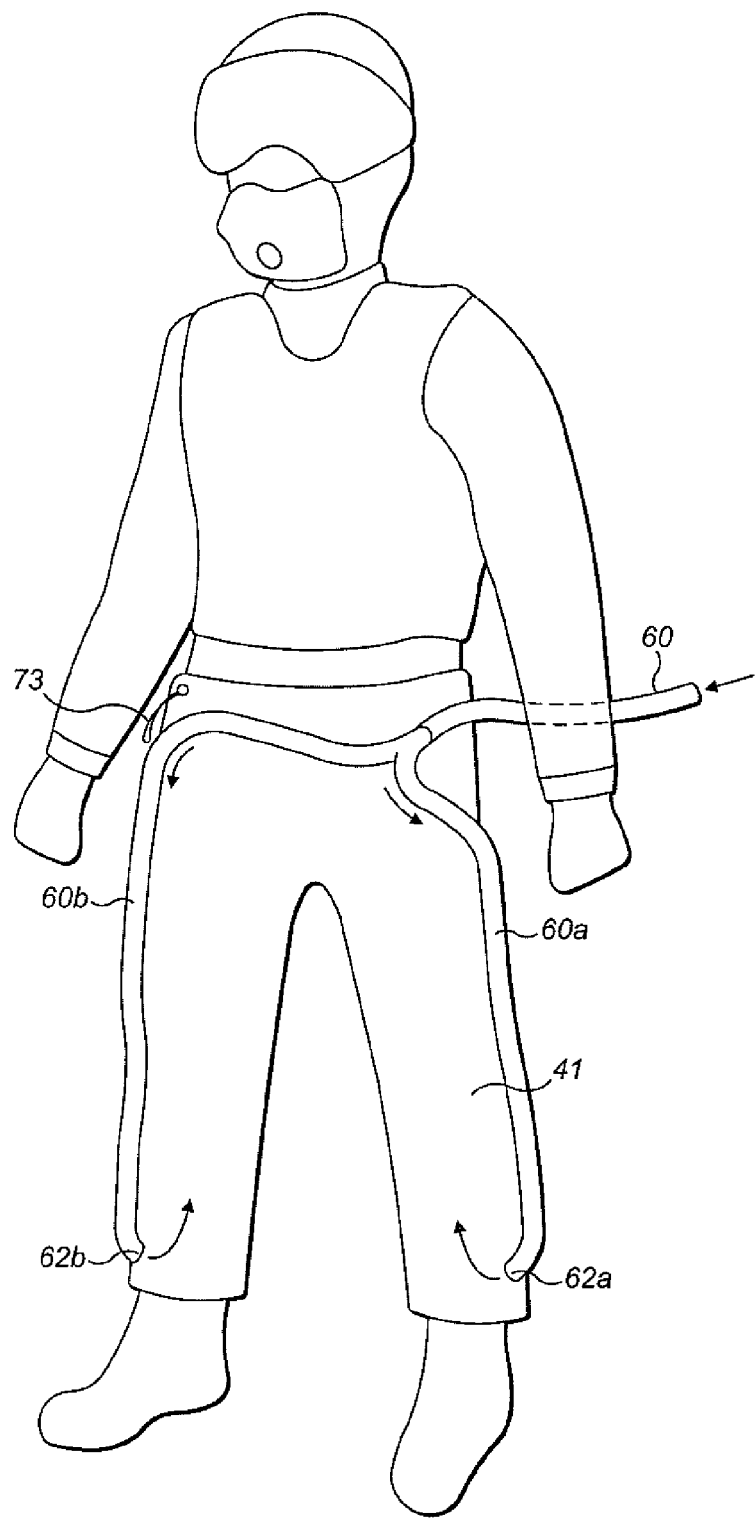
Figure 27A:
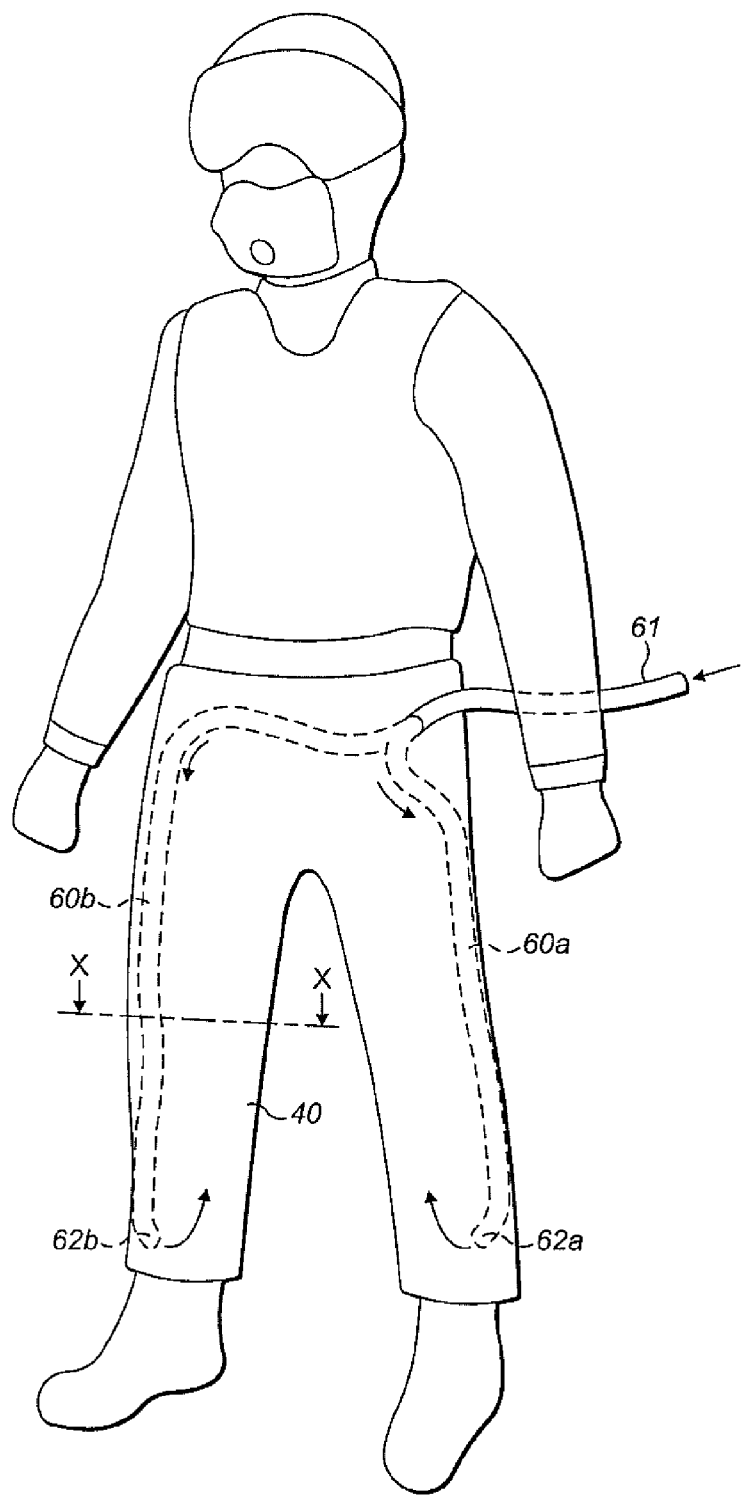
Figure 27B:
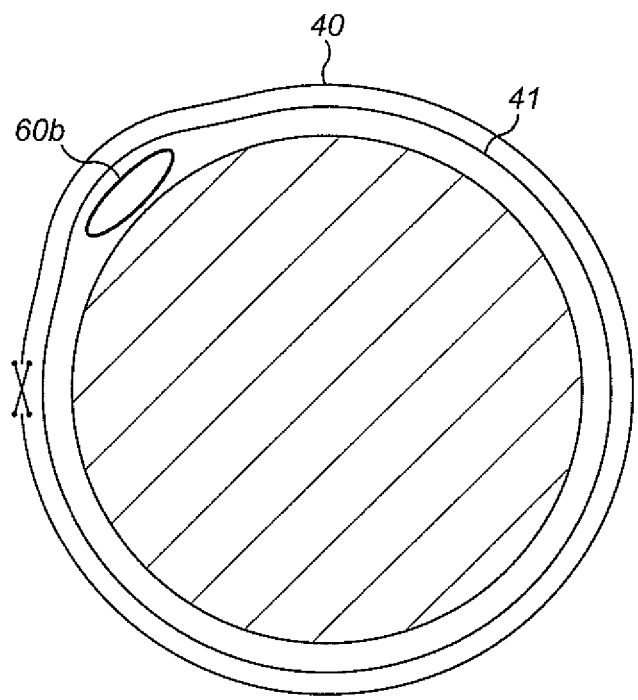
Figure 28:
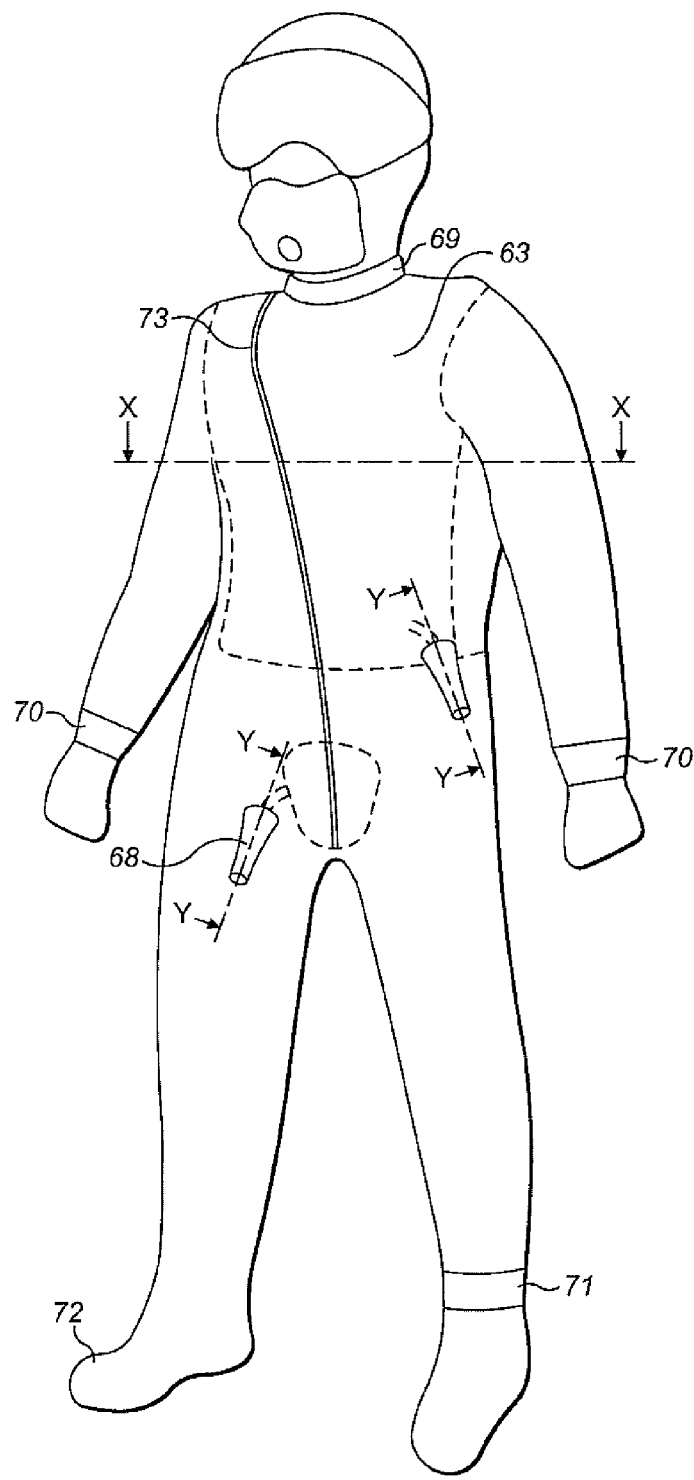
Figure 29:
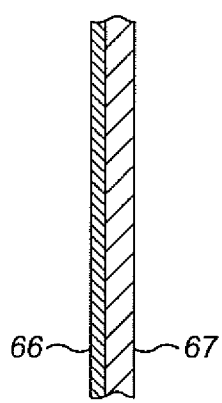
Figure 30:
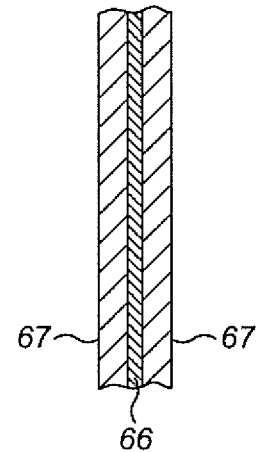
Figure 31:
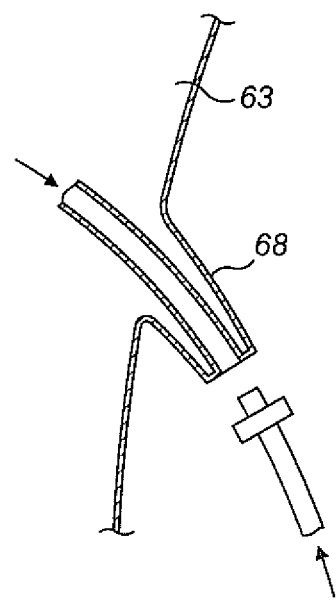

The following is a more detailed description of some embodiments of the invention, by way of example, reference being made to the accompanying drawings, in which:

FIG. 1 is a general view of an aircrew ensemble including a chest counterpressure assembly and full cover lower body G force assembly, FIG. 2 is a section on the line X-X of FIG. 1, FIG. 3 is a cross-section on the line Z-Z of FIG. 1, FIGS. 4a and 4b are alternative partial cross-sections on the line X-X of FIG. 3 showing the passage of sweat through the lower body G force assembly in respective first and second different regimes, FIG. 5 is a similar view to FIG. 1 but showing a partial cover lower body G force assembly, FIG. 6 is a cross-section on the line Y-Y of FIG. 5 through a lower body G force bladder of the assembly of FIG. 5, FIGS. 7a and 7b are cross-sections on the line X-X of FIG. 2 showing, deflated and inflated respectively, a second form of lower body G force bladder of the assembly, FIGS. 8a and 8b are cross-sections on the line X-X of FIG. 2 showing, deflated and inflated respectively, a third form of lower body G force bladder of the assembly, FIG. 9 is a similar view to FIG. 1 but showing an aircrew ensemble with an alternative form of chest counter pressure assembly and full cover lower body G force assembly, FIG. 10 is a schematic view of a grill bladder for the ensemble of FIG. 9, FIG. 11 is a schematic view of a finger bladder for the ensemble of FIG. 9, FIG. 12 is a cross-section on the line X-X of FIG. 9 showing the inflation of a chest bladder of the chest counter pressure assembly of FIG. 9, FIGS. 13a and 13b are cross-sections on the line Y-Y of FIG. 9 showing a bladder of the lower body G force assembly respectively deflated (13a) and inflated (13b), FIGS. 14a, 14b, 14c and 14d are partial cross-sectional views of an alternative embodiment of bladder for the ensemble of FIG. 9 in which the bladder is self-tightening, FIGS. 14a and 14c showing the bladder un-inflated and FIGS. 14b and 14d showing the bladder inflated, FIG. 14e is a similar view to FIGS. 14a, 14b, 14c and 14d but showing a known non-self tightening bladder, FIG. 15 is a similar view to FIG. 1 but showing an aircrew ensemble with detachable bladders, FIG. 16a is a schematic view of a detachable chest bladder for the ensemble of FIG. 15, FIG. 16b is a schematic view of a detachable leg bladder for the ensemble of FIG. 15, FIG. 16c is a section on the line X-X of FIG. 16a and showing the bladder of FIG. 16a mounted on a jacket of the ensemble of FIG. 15, FIG. 16d is a section on the line Y-Y of FIG. 16b and showing the bladder of FIG. 16b mounted on a lower body G force garment of the ensemble of FIG. 15, FIG. 17 is a schematic side elevation of an aircrew in an ejector seat of an aircraft an wearing an ensemble for countering G forces of any on the kinds shown in FIGS. 1 to 16d and showing the flow of body fluids under $G_z$ forces, FIG. 18 is a section on the line X-X of FIG. 17 showing schematically blood vessels of the aircrew of FIG. 17 in an undistended position, FIG. 19 is a similar view to FIG. 18 but showing the blood vessels in a distended position as a result of $G_z$ forces, FIG. 20 is a similar view to FIG. 19 and showing the effect of a full cover lower body G force garment, FIG. 21 is a schematic section through part of a lower leg and ankle carrying an inflatable lower body G force assembly with inflation proceeding towards the ankle, FIG. 22 is a similar view to FIG. 21 but showing inflation starting from the ankle, FIG. 23 is a similar view to FIG. 22 but showing the progression of inflation from the ankle and the use of an inlet at the ankle, FIG. 24 is a similar view to FIG. 23 and showing the further progression of inflation from the ankle, FIG. 25 is a similar view to FIGS. 21 and 22 but showing the application of a residual pressure to the leg, FIG. 26 is a schematic front elevation of an aircrew ensemble including a lower body G force bladder assembly providing the ankle inflation and residual pressure of FIGS. 22, 23 and 24 and showing a first form of air supply, FIG. 27a is a similar view to FIG. 26 but showing a second form of air supply, FIG. 27b is a section on the line X-X of FIG. 27a, FIG. 28 is a schematic front elevation of an aircrew wearing an environmental protection layer undergarment, FIG. 29 is a cross-section through part of a first form of the undergarment of FIG. 28, FIG. 30 is a cross-section through part of a second form of the undergarment of FIG. 28, and FIG. 31 is a cross-section on the line Y-Y of FIG. 28 showing a "pass through".

Referring first to FIG. 1, the aircrew ensemble includes a flight suit that comprises an upper suit portion 20 and lower suit portion 21. The upper suit portion 20 and the lower suit portion 21 are preferably made from an inherently fireproof fabric such as a flame-resistant aramid polymer. For example, NOMEX® is a flame-resistant meta-aramid material developed by Dupont®. The upper suit portion 20 has a torso portion 22, a waist 23, a neck opening 24 and left and right arm portions 25a, 25b, respectively. The upper suit portion also has a front opening 26 closed by, for example, a zipper 27. The lower suit portion 21 has a waist 28 and left and right leg portions 29a, 29b. The suit is completed by gloves 30 and boots 31.

The upper portion 20 and the lower portion 21 may be formed in one-piece with a front central longitudinal zip or may be formed as separate parts and connected at the waist as described in our co-pending UK patent application No. 1016375.6.

The upper portion 20 carries a chest counter pressure assembly in the form of a jacket 32 containing a chest counter pressure bladder 33. Referring next to FIG. 2, the jacket 32 is formed of inner and outer layers 34, 35 of non-elastic but moisture-vapor permeable material that hold the bladder 33 between them located on the chest 36 of a wearer. As seen in FIG. 2, the outer layer 35 is formed by front and rear portions 35a, 35b that are interconnected by two rows of side lacing 38a, 38b located at respective opposite sides of the outer layer 34 to allow the circumferential length of the jacket 32 to be adjusted to the correct fit for a wearer. This is important for reasons that will become apparent below. The bladder 33 is formed of a moisture-vapor permeable material that allows sweat to evaporate through the material. The bladder 33 has an inlet 39 for connection to an inflation hose that, in turn, is connected to an inflation system for supplying air under pressure to the bladder 33, in a manner to be described below. The inflation system may be part of a breathing system for the wearer.

Referring once again to FIG. 1, and also to FIG. 3, the lower portion 21 carries a lower body G force assembly 40 and a lower body G force bladder 41. The lower body G force assembly 40 is formed by inner and outer layers 42, 43 of non-elastic but moisture-vapor permeable material that hold the lower bladder 41 between them and are located around the legs of a wearer (one of which is shown in FIG. 3) and over the abdomen of the wearer. As seen in FIG. 3, the outer layer 43 is formed with a side opening whose edges are interconnected by a row of side lacing 44 located to allow the circumferential length of the jacket outer layer 43 to be adjusted to the correct fit for a wearer. This is important for reasons that will become apparent below. The bladder 41 is formed of a moisture-vapor permeable material that allows sweat to evaporate through the material. The bladder 41 has an inlet 45 for connection to an inflation hose 90 that, in turn, is connected to an inflation system 91 for supplying air under pressure to the bladder 41, in a manner to be described below.

The lower body G force bladder 41 has also an outlet 46 at each ankle connected to respective bladders (not shown) in respective boots 31.

In use, an aircrew such as a pilot dons the suit with the jacket 32 and lower body G force garment 40. The lacings 38a, 38b and 44 are tightened to ensure that the jacket 32 and the garment 40 are a close fit around the torso and the lower body portion respectively of the wearer so that, when inflated, the bladders 33, 41 apply a required restriction (see below). The inlet 39 to the chest bladder 33 is connected via a G force valve (not shown) to a source of pressurized air that, as described above, which may also be the aircraft breathing circuit. The inlet 45 to the lower body G force bladder 41 is also connected via a G force valve (not shown) to a source of pressurized air. Whilst in flight, the chest bladder 33 and the lower body G force bladder 41 are pressurized and depressurized through the aircraft's pressurization system and the G force valve. This happens as the aircraft experiences G forces and the valves open and close at pre-determined values of G forces.

Since the material of the two bladders 33, 41 is a moisture-vapor permeable or "porous" or "semi permeable" material, it is possible for sweat to evaporate through the layers and therefore to provide evaporative cooling even when the bladders are not connected to an air supply. See FIG. 4a in which the arrow 47 shows the passage of sweat vapor through the G force garment 40. This cooling effect can be further enhanced in other ways. When air is supplied to the bladders 33, 41, this ventilates the G force garment bladders 33, 41 and increases the evaporative effect through them, since the material being used is moisture-vapor permeable. If the lower body G force bladder 41 is connected to an air pump or blower when not in flight, this can also be used to ventilate the lower body G force bladder 41 and again increases the evaporative cooling effect. This is shown in FIG. 4b where arrows 48 shows circulating air moving sweat vapor around the bladder 41 before it passes through the bladder 41.

Referring next to FIG. 5, an alternative form of the lower body G force bladder has the lower body G force bladder 49 in the form of a partial cover bladder. Parts common to FIGS. 1 to 4 and to FIG. 5 are given the same reference numerals and will not be described in detail.

The partial cover lower body G force bladder 49 is formed by a first bladder portion 49a that extends across the front abdomen of a wearer and then down the front of the thighs of the wearer to just above the knee. Second and third bladder portions 49b, 49c extend over respective left and right shins of the wearer. These bladder portions 49a, 49b and 49c are interconnected and connected to a source of pressurized air as described above in relation to FIGS. 1 to 4.

Referring next to FIG. 6, the shin bladders 49b, 49c extend only around the front of the leg 50 of the wearer. When the bladders 49b, 49c are inflated, the diameter of the outer layer 43 increases and so draws the non-elastic outer layer 43 against the rear of the leg 50 of the wearer. This, together with the pressure applied by the bladder 43b, 43c to the front of the leg, provides the constriction necessary to counter G forces.

In the embodiments of FIGS. 1 to 4, the bladder 41 is sized to extend exactly around the associated body part. This need not be the case. If the material of the bladder 41 is inelastic, the bladder 41 may be sized so that when uninflated the bladder 41 is of greater diameter than the body part it encircles (see FIG. 7a). Thus, when inflated, the bladder 41 is not subject to hoop stress (see FIG. 7b) and the tension is taken up by the seams of the outer layer 43 and not by the seams 41a of the bladder 41, which are weaker than the seams of the outer layer 43.

Alternatively, if the bladder 41 is made from an elastic material, it can be sized so that, when uninflated, it is of lesser diameter than the limb 50 it encircles so as to reduce the bulk of the garment (see FIG. 8a). When inflated (see FIG. 8b), the circumferential length increases to surround the limb 50.

The principles described above with reference to FIGS. 7a, 7b and 8a, 8b are not limited to bladders such as the lower body G force bladders 33, 41 that, when inflated, extend all around a body part. The same principle could be applied to other bladders, such as the chest compression bladder 33, by containing the bladder in a pocket formed in the associated garment. Where the bladder is of inelastic material (such as in FIGS. 7a, 7b), the pocket is smaller than the uninflated bladder so that, when inflated, the inflated bladder is confined by the pocket and tension is taken by the material of the garment. If the bladder is of elastic material (FIG. 8a, 8b) then the pocket is larger then the uninflated bladder, with the bladder, on inflation, expanding to fill the pocket.

There are a number of ways of designing a bladder 33, 41 to reduce further the thermal burden. These can be used with or without the permeable materials previously described.

Referring next to FIG. 9, parts common to FIGS. 1 to 8 and to FIG. 9 are given the same reference numerals and will not be described in detail. In this embodiment, the chest bladder 33 and the lower body G force bladder 41 are provided with elongate slots 51 to form "grill" bladders 33, 41-seen schematically in FIG. 10. Alternatively, as seen schematically in FIG. 11, they can be formed as a series of inter-connected bladder tubes 52 ("fingers") connected by a manifold such that there are spaces formed by the bladder slots 51 or by spaces 52a between the fingers 52b that allow air movement through the spaces 51, 52a when the bladder 33, 41 is deflated and therefore evaporative cooling of sweat is assisted when uninflated. This is shown in more detail in FIG. 12 for the chest bladder 33 where it will be seen that, when the bladder 33 is uninflated, evaporative cooling can take place through the slots 51 or spaces 52a.

However when inflated, the bladder 33, 41 expands laterally and outwardly to provide the continuous counter-pressure needed (seen in broken line in FIG. 12 for the chest bladder 33 and in FIGS. 13a (uninflated) and 13b (inflated) for the lower body G force bladder 41).

In these embodiments, therefore, the bladder 33, 41 has an uninflated area and is formed, inwardly of the periphery of that area, with one or more open gaps that allow air movement through the gap or gaps to increase evaporative cooling. The or each gap closes or substantially closes on inflation of the bladder 33, 41.

Referring next to FIGS. 14a to 14e, the grill or finger bladders 33, 41 can be made with an outer layer 53 of non-stretch material and an inner layer 54 of elastic material. When such a bladder 33, 41 is inflated, the outer layer 53 will bulge (because it is non-stretch) and so reduce the circumferential length of the bladder 33, 41. The inner layer 54 will stretch (rather than bulge) and so apply even pressure to the flesh (see FIGS. 14b and 14d). This helps to reduce a problem of traditional G force bladders made wholly of non-stretch materials that, when they are inflated, the cover of the bladder "balloons" both inwardly and outwardly. This "ballooning" causes restriction in the cockpit due to the bulk of the inflatable section increasing and can interfere dangerously with the pilot controls. This effect is greatly reduced in this dual material "finger" or "grill" bladder design. It is only by the inner layer 54 being elastic that the inner/internal space is filled and the pressure surface is then applied evenly to the body part. If this is not applied evenly then this leads to petechial hemorrhaging (see FIG. 14e) where the surface vessels burst under the skin in the areas where uneven pressure produces areas of insufficient pressure to counteract the increased internal pressure in the vessels.

In the embodiments described above with reference to FIGS. 1 to 14, the bladders 33, 41, 49 are all carried between inner and outer layers 34, 35 and 42, 43 of a jacket 32 or lower body G force garment 40. In the case of partial cover bladders 49a, 49b and 49c, the bladders 49a, 49b and 49c are secured by, for example, stitching to the outer layer 43. This is not necessary.

Referring next to FIGS. 15 and 16a, 16b, 16c and 16d, parts common to these Figures and to FIGS. 1 to 14 are given the same reference numerals and will not be described in detail. In this embodiment, the jacket 32 and the lower body G force garment 40 are formed from a single layer of material. The chest bladder is formed by a single front bladder 56 that is attached to the jacket 32 by releasable fastenings 57 such as press studs or touch close fasteners or zippers or other mechanical means (see FIG. 16b). Similarly, the lower body G force bladder 41 is attached to the lower body G force garment 40 by releasable fastenings 57 such as press studs or touch close fasteners or zippers or other mechanical means (see FIG. 16b).

As seen in FIGS. 16c and 16d, the bladders 56, 41 may be covered with an inner lining 59 that forms a pocket with the associated garment that can be opened at one side 59a to allow insertion of the bladder 54, 41.

If the bladders 33, 41 of the suit described above with reference to FIGS. 1 to 14 are damaged or punctured, then the suit becomes non functional and normally has to be replaced in its entirety or has to be stripped down into component parts and reassembled when the faulty part is replaced. The bladders 33, 41 may need to be taken apart and then replaced as the suit is being rebuilt. The bladders 33, 41 are particularly vulnerable to damage caused by wear and tear as they are constantly being inflated and deflated and being worn in a suit in which mechanical action inside the cockpit can easily damage the bladders 33, 41.

Referring next to FIGS. 17, 18, 19 and 20, when an aircrew in an aircraft that experiences high Gz acceleration is subjected to high G forces when in a curved flight, then the body fluids (in particular the blood, more particularly venous blood) are accelerated in the z direction (i.e. from head to toe) (see FIG. 17). As the mass of the fluid is increased by the acceleration, so the hydrostatic pressure of the fluid is increased progressively and linearly in the z direction (see also FIG. 17). As the walls of human blood vessels 65 are essentially "elastic", then the volume of the vessels 65 is increased in the z direction progressively and linearly i.e. in the lower limbs (see FIGS. 18 and 19).

As a consequence of this, the volume of blood overall is increased in the lower limbs (blood pooling) and decreased in the upper part of the abdomen as the volume of blood in the body is constant. Decreasing the volume of blood in the upper part of the abdomen also leads to a decrease of blood volume in the head. At the same time as the blood is being accelerated in the z direction, the heart, aorta and other large vessels of the abdomen are also displaced in a z direction which adds to a further reduction in the total blood volume in the upper part of the body and therefore in the head. (This is known as the caudal effect). As a consequence of reducing the available blood pressure and volume in the brain (and in particular the supply of blood to the eyes), a dangerous lowering of the blood oxygen concentration in the brain occurs. This leads first to a loss of colour in the vision and then a loss of peripheral vision (grey out and tunnel vision). Ultimately G force induced loss of consciousness (GLOC) occurs. This clearly has a detrimental affect on the aircraft pilot and ultimately the loss of the aircraft and the death of the aircrew may follow.

To counteract this negative affect of blood pooling in the lower limbs, counter pressure garments to cover the lower limbs have been developed as described above and, for example, with reference to FIGS. 1 to 16 and in WO 2007/111981 and U.S. Pat. No. 6,325,754. As seen in FIG. 20, the effect of such a garment 66 is to restrict the leg blood vessels 65 and so force blood back into the upper part of the body.

As well as the use of counter pressure garments, aircrew are trained to carry out physiological maneuvers (Anti-G force Straining Maneuvers-AGSM) and this is done by tensing the voluntary muscles and pressurizing pressurising the chest/lungs, the action of both of these being to reduce the effect of G force acceleration on the body. This is, however, very tiring and limits the G force endurance that can be tolerated and it also limits voice communication and voice command whilst straining under AGSM. The goal of a G force protection garment and its development is to limit the amount of pilot effort required by maximizing the protection offered by the garment and therefore increasing overall G force endurance. Additionally, pilots can also breathe pressurized gas (Positive Pressure Breathing for G force, PPBG) such that the thoracic pressure/thoracic blood pressure is increased causing more dissolved oxygen to be carried to the brain.

One type of counter pressure (anti-G force) garments is gas pressurized by inflating gas holding bladders from an aircraft compressor or compressed gas supply and which are restrained around the lower limbs and lower abdomen by covers which apply a counter pressure as described above with reference to FIGS. 1 to 16 and therefore limit the "blood pooling" in the lower limbs and limit the z displacement of the heart and major blood vessels (caudal effect) (see FIG. 20). Referring next to FIG. 21, in such a suit, an inflation pressure front 80 travels down the lower body G force bladder 41, 49, moving in a direction opposite to that of the venous blood to apply the pressure to the leg (see also FIG. 20) that limits blood pooling.

Referring next to FIGS. 22 and 23, the suit described above with reference to any of FIGS. 1 to 20 may be modified so that the air supply applies the gas inflation/pressurization to the lower body G force bladder 41, 49 at the ankles first ("ankle inflation") rather than applying the pressure first at the abdominal level. This benefits the wearer by tending to increase the venous blood return up the lower limbs and thereby increasing the blood volume/pressure in the upper body and head. The pressure point 81 from the applied air thus starts at the ankle (see FIG. 22) and continues up the leg (see FIG. 23) in the same direction as the venous blood until the bladder reaches an operating pressure.

In addition, the air supply may be modified to apply continuously a residual "gas pressure" to the lower body G force bladders 41, 49 and thus constriction to the lower limbs such that blood pooling is continuously reduced in the lower limbs. (This is termed "start-pressure" and is less than the operating pressure). This is shown in FIGS. 24. This benefits the wearer by continuously reducing blood pooling and overcomes the "lag" phase in the G force garment inflation system. This may be supplied automatically or may be controlled by the wearer utilizing a squeezable bulb 73 (see FIG. 25).

Referring next to FIG. 26, the air supply to the ankles may be through two external hoses 60a and 60b connected by a single hose 61 to the air supply. Each hose 60a, 60b runs along a respective leg of the lower body G force garment 41 to a respective inlet 62a, 62b at an associated ankle. Alternatively, as seen in FIGS. 27a and 27b, the hoses 60a, 60b may run through the interior of the lower body G force bladder 4 1 (see FIG. 27b) to the respective inlets 62a, 62b.

Traditionally aircrew who have to leave an aircraft in an emergency (ejection or bail out etc.) are protected by special garments against the effects of cold water and cold air exposure which are worn as part of the aircrew's ensemble, if the aircrew is expected to be at risk.

These are normally of three types—a thermal protection undergarment, which is normally worn as underwear whenever the aircrew is flying in very cold conditions, a thermal protection over garment (normally called a winter land coverall) and is worn if the aircrew is flying over cold land or an immersion protection garment which is worn if the aircrew are flying over water. Therefore the aircrew selects the type of garment ensemble required to meet a range of mission requirements (e.g. over land or over water) and the relevant environmental conditions (hot or cold climate etc.). A considerable number of different ensembles are therefore required in order to meet different mission roles and to accommodate different aircraft types. This leads to an excessive logistical burden and cost as well as the problems of incompatibility between the different garment ensembles and the flight equipment as well as the different aircraft types.

In any of the embodiments of the invention described above with reference to the drawings, or in similar known ensembles, a single protection undergarment may worn whenever the environmental conditions require it (hot or cold climate) and is suitable for any mission role and in any aircraft type ("multi mission/multi platform commonality"). This single undergarment, which is called an Environmental Protection Layer—EPL therefore fulfils the multiple roles of the other garment ensembles and therefore has a number of specialised aspects to it.

Referring to FIG. 28, the undergarment 63 is made of a material that is relatively elastic and includes a "four-way stretch". This allows it to be donned easily but at the same time is not over-size and therefore can be made as a slim-fitting garment. This is very important as it is worn underneath the flight suit and cannot afford to be bulky. Because the material is elastic, the garment can be slim fitting but will not restrict the body movement of the wearer.

The undergarment 63 covers the torso, arms and legs of the wearer and is provided with a neck seal 69, wrist seals 70 and ankle seals 71. Alternatively, as seen on the right-hand leg in FIG. 28, the undergarment 63 may be formed with integral socks 72. A zipper 73 allows the undergarment 63 to be donned and doffed.

The material of the undergarment 63 is moisture-vapor permeable (MVP) but at the same time waterproof and therefore allows perspiration to pass through so that when an aircrew is wearing the undergarment 63 there is not an excessive heat burden that could lead to hyperthermia. For example if an aircrew is in an aircraft on a hot sunny day but flying over cold water, then he/she could become hyperthermic before he/she enters the cold climate area.

Referring next to FIG. 29, the MVP film 66 is combined with a thermal barrier 67 into one material to create the undergarment 63. The thermal barrier 67 may be merino wool knit coated with the MVP film 66, for example an MVP polyurethane film. This allows the garment to be easily welded rather than being sewn and then sealed with waterproof tape. Merino wool has a number of particular benefits but other types of thermal insulation material could be used. Merino wool provides very effective thermal insulation against cold even when damp or wet. In addition, it has a relatively low thermal burden when worn in a hot climate. Merino wool is a "hollow microfiber" which contributes to its excellent qualities. Further, it is naturally biostatic and therefore does not smell, it has a good feel next to the skin and good "drape" and it launders well without "pilling".

Referring next to FIG. 30, if the undergarment 63 is required to be fire retardant (flame proof), then an outer layer 67 of an inherently flame proof material (e.g. NOMEX®) can be applied to the bilaminate of the MPV film 66 and the thermal layer 67 (as an a trilaminate). This outer layer 67 is not normally required as the EPL is worn underneath the flight suit, such as described in our co-pending UK Patent Application No. 1016375.6 which provides the required protection against flame, dirt, grease, etc.

The material of the undergarment 63 can also be made to be resistant to chemical, biological and warfare agents (CBRN) and the undergarment 63 can therefore provide protection against environmental conditions as well as against CBRN. The chemical, biological repellency can be created by using various types of plasma enhancement or other associated nano technologies.

There are also a number of other features that can be included in the undergarment 63. There are "pass throughs". These are a means of making a waterproof connection from an item worn on the inside of the suit to the exterior of the suit. Referring again to FIG. 27, this might include a liquid or air cooling garment 64 worn underneath the undergarment 63 and connected to a power unit worn on the exterior allowing for a cooling capability to the aircrew. In addition, referring to FIG. 30, a bladder relief device (BRD) 68 can be worn under the undergarment 63 and can be connected to a disposal bag worn on the exterior of the undergarment 63.

If the undergarment 63 is going to be worn in exceptionally cold conditions, then an additional thermal undergarment can be worn underneath the undergarment 63 or an electrically heated (electro-resistive) pad or panel or vest can be worn beneath the undergarment 63 and run off a power source such as a battery and can therefore provide additional heating in extreme conditions. This pad or panel or vest can be attachable/detachable to the undergarment 63 or it can be integrated into it or indeed it can be included as a separate garment.

Having such a single undergarment 63 that allows for a multi mission/multi role commonality reduces substantially logistical burden and cost as well as reducing the overall bulk of the garment ensemble that is worn. Traditionally, immersion protection garments are made over-size so that they can be easily donned (this is difficult because of the seals and waterproof zippers etc.). Also the garments need to be over-size so that there is no restriction to movement. These disadvantages are avoided in the undergarment 63 described above with reference to the drawings.

The invention claimed is:

1. An ensemble comprising
a garment having a plurality of moisture-vapor permeable fabric layers sized and shaped to cover at least a part of a body of a wearer; and
an inflatable counter-pressure bladder sized and shaped to be positioned between the moisture-vapor permeable fabric layers of the garment, the bladder being formed from a moisture permeable material allowing the passage therethrough of perspiration from the wearer's body, the bladder defining one or more gaps that are open to allow evaporative cooling through the moisture-vapor permeable fabric layers of the garment and the one or more gaps of the bladder when the bladder is uninflated, the one or more gaps closing or substantially closing on inflation of the bladder.

2. An ensemble according to claim 1 in combination with an inflation system for inflating the bladder when a threshold G-force is detected acting on the wearer's body, the inflation system also being operable in the absence of said threshold G-force to ventilate the bladder to increase the evaporative cooling effect on the wearer's body.

3. An ensemble according to claim 1 wherein the garment includes at least one layer of inextensible material, inflation of the bladder causing the bladder to act against the layer of inextensible material to apply counter-pressure to the wearer's body.

4. An ensemble according to claim 3 wherein the garment includes two layers, the inflatable bladder being located between said two layers.

5. An ensemble according to claim 3 wherein the inflatable bladder is a chest compression bladder and the garment is sized and shaped to cover a torso of the wearer.

6. An ensemble according to claim 3 wherein the inflatable bladder is a lower G bladder and the garment is sized and shaped to cover an abdomen and legs of the wearer.

7. An ensemble according to claim 6 wherein the lower G bladder extends across the abdomen and around the legs of the wearer.

8. An ensemble according to claim 6 wherein the lower G bladder includes a first portion for extending over the abdomen and thighs of the wearer and second portions extending over respective shins of the wearer.

9. An ensemble according to claim 3 wherein the bladder is made from an elastic material so that, when the bladder is uninflated, the bladder extends only partially over an associated body part of the wearer to allow evaporative cooling from the uncovered body part, inflation of the bladder causing elastic lengthening of the bladder to extend the bladder over the whole area of the associated body part.

10. An ensemble according to claim 3 wherein the bladder is made from an inelastic material, the bladder having an area greater than area of the associated body part of the wearer and being confined by the garment so that, when inflated, the bladder has the area of the associated body part, so that the material of the bladder is untensioned, the tension being taken by the garment.

11. An ensemble according to claim 9 wherein the bladder is a lower G bladder, and the associated body part is a leg of the wearer, and the area is the surface circumference of the leg.

12. An ensemble comprising:
a garment having a plurality of moisture-vapor permeable fabric layers sized and shaped to cover at least a part of a body of a wearer; and
an inflatable counter-pressure bladder sized and shaped to be positioned between the moisture-vapor permeable fabric layers of the garment, the bladder defining one or more gaps that are open to allow evaporative cooling through the moisture-vapor permeable fabric layers of the garment and the one or more open gaps of the bladder when the bladder is uninflated, the one or more gaps closing or substantially closing on inflation of the bladder.

13. An ensemble according to claim 12 wherein the one or more gaps comprise elongate slots.

14. An ensemble according to claim 12 wherein the bladder is formed with two or more tubes, adjacent tubes being separated by an associated said gap when uninflated, the gap closing on inflation of the bladder.

15. An ensemble according to claim 12 wherein the bladder is sized and shaped to extend around a leg of a wearer and is formed from connected inner and outer layers, the inner layer, in use, being closer to the leg of the wearer than the outer layer, the inner layer being made of an elastic material and the outer layer being made of an inelastic material, so that, on inflation around the leg of the wearer, the outer layer bows and so decreases the circumferential length of the bladder to tighten the bladder around the leg and to close or substantially close each gap, the inner layer conforming elastically to the shape of a portion of the leg contacted by said inner layer to apply pressure evenly to the portion of the leg.

16. An ensemble according to claim 12 wherein the moisture-vapor permeable fabric layers allow the passage therethrough of perspiration from the wearer's body.

* * * * *